(12) United States Patent
Barber

(10) Patent No.: US 8,258,645 B2
(45) Date of Patent: Sep. 4, 2012

(54) WIND TURBINE WITH SAIL EXTENSIONS

(76) Inventor: Gerald L. Barber, Greenville, SC (US)

( * ) Notice: Subject to any disclaimer, the term of this patent is extended or adjusted under 35 U.S.C. 154(b) by 457 days.

(21) Appl. No.: 12/607,440

(22) Filed: Oct. 28, 2009

(65) Prior Publication Data

US 2010/0266407 A1    Oct. 21, 2010

Related U.S. Application Data

(63) Continuation-in-part of application No. 12/426,494, filed on Apr. 20, 2009, now Pat. No. 8,109,727, and a continuation-in-part of application No. 12/432,837, filed on Apr. 30, 2009, now Pat. No. 7,825,532, and a continuation-in-part of application No. 12/492,187, filed on Jun. 26, 2009, now Pat. No. 8,174,142, and a continuation-in-part of application No. 12/499,206, filed on Jul. 8, 2009, now Pat. No. 8,164,212.

(51) Int. Cl.
*F03D 9/00* (2006.01)
*H02P 9/04* (2006.01)

(52) U.S. Cl. ....................................... 290/55

(58) Field of Classification Search ............. 290/55
See application file for complete search history.

(56) References Cited

U.S. PATENT DOCUMENTS

| | | | | |
|---|---|---|---|---|
| 1,461,048 A * | 7/1923 | Roman | ............. | 416/51 |
| 1,944,239 A | 4/1931 | Honnef | ............. | 290/55 |
| 3,912,937 A | 10/1975 | Lesser | ............. | 290/43 |
| 3,995,170 A | 11/1976 | Graybill | ............. | 290/55 |
| 4,003,676 A | 1/1977 | Sweeney et al. | .......... | 416/132 B |
| 4,111,601 A | 9/1978 | Richard | ............. | 416/41 |
| 4,150,301 A | 4/1979 | Bergey, Jr. | ............. | 290/44 |
| 4,319,865 A | 3/1982 | Richard | ............. | 416/41 |
| 4,330,714 A | 5/1982 | Smith | ............. | 290/55 |
| 4,350,895 A | 9/1982 | Cook | ............. | 290/55 |
| 4,364,708 A | 12/1982 | David | ............. | 416/132 B |
| 5,299,913 A | 4/1994 | Heidelberg | ............. | 416/197 A |
| 5,599,168 A * | 2/1997 | Lund | ............. | 416/136 |
| 6,015,258 A | 1/2000 | Taylor | ............. | 415/4.4 |
| 6,064,123 A | 5/2000 | Gislason | ............. | 290/55 |
| 6,091,161 A | 7/2000 | Dehlsen et al. | ............. | 290/43 |
| 6,849,965 B2 | 2/2005 | Le Nabour et al. | ............. | 290/55 |
| 6,951,443 B1 | 10/2005 | Blakemore | ............. | 415/4.3 |
| 6,979,171 B2 | 12/2005 | Lauritsen | ............. | 415/4.3 |
| 7,090,550 B2 * | 8/2006 | Wilkie | ............. | 440/49 |

(Continued)

FOREIGN PATENT DOCUMENTS

EP       0015131       9/1980

(Continued)

OTHER PUBLICATIONS

International Search Report and Written Opinion dated Jul. 2, 2010, PCT/ISA/220 of PCT/US 10/031582.

(Continued)

*Primary Examiner* — Pedro J Cuevas
(74) *Attorney, Agent, or Firm* — Thomas, Kayden, Horstemeyer & Risley, LLP

(57) ABSTRACT

A wind turbine (10) includes a turbine wheel (12) with radially extending turbine blades (20) supported between the axis structure (16) and the circular rim (18) of the turbine wheel. Turbine blade extensions (22) are positioned in alignment with the turbine blades and may be pivotally mounted on the circular rim.

22 Claims, 6 Drawing Sheets

U.S. PATENT DOCUMENTS

| | | | |
|---|---|---|---|
| 7,098,552 B2 | 8/2006 | McCoin | 290/44 |
| 7,156,037 B2 | 1/2007 | Borgen | 114/264 |
| 7,218,011 B2 | 5/2007 | Hiel et al. | 290/43 |
| 7,323,792 B2 | 1/2008 | Sohn | 290/55 |
| 7,331,762 B2 | 2/2008 | Fraenkel | 416/85 |
| 7,358,624 B2 | 4/2008 | Bacon | 290/55 |
| 7,791,214 B2* | 9/2010 | Hill | 290/54 |
| 7,825,532 B1* | 11/2010 | Barber | 290/55 |
| 8,109,727 B2* | 2/2012 | Barber | 416/132 B |
| 8,134,251 B2* | 3/2012 | Barber | 290/55 |
| 8,164,212 B2* | 4/2012 | Barber | 290/55 |
| 8,174,142 B2* | 5/2012 | Barber | 290/55 |
| 8,178,993 B1* | 5/2012 | Barber | 290/55 |
| 2003/0168864 A1 | 9/2003 | Heronemus et al. | 290/55 |
| 2003/0227174 A1 | 12/2003 | Bayly | 290/55 |
| 2004/0185725 A1* | 9/2004 | Wilkie | 440/49 |
| 2006/0012182 A1 | 1/2006 | McCoin | 290/55 |
| 2006/0275121 A1 | 12/2006 | Merswolke et al. | 416/132 B |
| 2007/0013196 A1 | 1/2007 | Chen | 290/55 |
| 2007/0024060 A1 | 2/2007 | Bacon | 290/55 |
| 2007/0166159 A1 | 7/2007 | Williams | 416/10 |
| 2008/0003105 A1 | 1/2008 | Nies | 416/95 |
| 2008/0084067 A1* | 4/2008 | Hill | 290/4 R |
| 2008/0253892 A1 | 10/2008 | Dehlsen | 416/147 |
| 2009/0096217 A1 | 4/2009 | Watson | 290/55 |
| 2010/0264661 A1* | 10/2010 | Barber | 290/55 |
| 2010/0264662 A1* | 10/2010 | Barber | 290/55 |
| 2010/0264663 A1* | 10/2010 | Barber | 290/55 |
| 2010/0264667 A1* | 10/2010 | Barber | 290/55 |
| 2010/0266412 A1* | 10/2010 | Barber | 416/147 |
| 2010/0295307 A1* | 11/2010 | Barber | 290/52 |
| 2011/0068729 A1* | 3/2011 | Barber | 318/538 |
| 2011/0076149 A1* | 3/2011 | Santiago et al. | 416/223 R |
| 2012/0060684 A1* | 3/2012 | Lavender et al. | 92/12.1 |
| 2012/0134815 A1* | 5/2012 | Carroll et al. | 416/23 |
| 2012/0139258 A1* | 6/2012 | Barber | 290/55 |

FOREIGN PATENT DOCUMENTS

| | | |
|---|---|---|
| GB | 2 100 688 | 1/1983 |
| JP | 2009-030586 | 12/2009 |
| WO | WO 03/046376 | 6/2003 |

OTHER PUBLICATIONS

International Search Report and Written Opinion dated Jun. 30, 2010, PCT/ISA/220 of PCT/US2010/031681.

International Search Report and Written Opinion dated Jun. 15, 2010, PCT/ISA/220 of PCT/US2010/031685.

International Search Report and Written Opinion dated Jun. 16, 2010 PCT/ISA/220 of PCT/US2010/031560.

International Search Report and Written Opinion dated Jun. 18, 2010.

* cited by examiner

WIND TURBINE WITH SAIL EXTENSIONS

CROSS REFERENCE

This is a continuation-in-part of U.S. patent application Ser. No. 12/426,494, filed Apr. 20, 2009, and of Ser. No. 12/432,837, filed Apr. 30, 2009, and of Ser. No. 12/492,187 filed Jun. 26, 2009, and of Ser. No. 12/499,206 filed Jul. 8, 2009.

FIELD OF THE INVENTION

This invention concerns a wind turbine assembly for the generation of electricity that includes one or more turbine wheels rotatably mounted on laterally extending central axes, with the turbine wheel driving generators of electricity.

BACKGROUND OF THE INVENTION

Windmills have been used for many generations for the purpose of pumping water from the ground and for generating electricity. The basic advantage of the windmill is that it uses the power of the wind to rotate a wheel having radially extending blades that are driven by the wind. This rotary movement may be converted into various useful purposes. For example, wind turbines in the form of propellers mounted on towers have been placed in areas where steady winds are prevalent and the wind turbines are used to generate electricity.

The blades of the conventional wind turbines are very large and made of expensive rigid material and are constructed to have the blades extend radially from a central hub, with no extra support at the outer tips of the blades. The conventional wind turbine blades rotate at a high rate of revolution and must withstand both the centrifugal forces generated by the fast revolution of the blades and the cantilever bending forces applied to the blades by the wind. Since the outer portions of the blades may be engaged by strong winds moving at a very high velocity, the larger the blades the stronger they must be and the more expensive they become. Thus, there is a practical limit as to the length and width of the blades because of the expense of stronger materials for larger blades.

The prior art shows some turbine wheels that have been constructed with circular rims that support the blades at the outer ends of the blades. This tends to reduce the stress applied by the wind to the blades, but the circular rims add more weight to the structure and present more wind resistance that increases the tipping forces applied to the mast that supports the turbine wheel.

Another type of wind turbine is one that has blades in the form of sail wings constructed of cloth that are a substitute for the rigid blades of the conventional wind turbines described above. For example U.S. Pat. Nos. 4,330,714, 4,350,895, and 4,729,716 disclose wind turbines that do not use rigid propeller blades but use sails that catch the wind. The sails are mounted on radiating spars of the turbine. These particular wind turbines include circular inner and outer rims with the sails of the turbine supported by both the inner and outer rims. The outer rim supports the outer portions of the sails so that the axial force of the wind applied to the sails may be absorbed to a major extent by the outer rim so there is little if any cantilever force applied to the sails. This allows the blades of the wind turbine to be formed of lighter weight material, material that is not required to bear as much stress in comparison to the typical free bladed turbine.

It appears that the above described prior art wind turbines do not have adequate control of the pitch of the blades for adjusting the pitch when the wind velocity changes or when starting or stopping the rotation of the turbine wheel.

The adjustment of the pitch of the turbine blades is important in order to adjust to the different atmospheric wind speeds. An important factor in a well designed airfoil's efficiency is its angle of attack to the apparent wind. The apparent wind is the direction of the wind that is blowing across the turbine blade as the blade rotates.

A blade is designed with a twist or "pitch" so that the leading edge will be at the ideal angle of attack to the apparent wind along the entire leading edge of the blade at a given wind speed. The apparent wind near the tip of the blade is faster than at the root of the blade and is at a different angle than the wind at the root of the blade. Whenever the wind is blowing faster or slower than the designed blade wind speed, the angle of the blade may be controlled so as, to adjust the blade to get the best angle of attack near the tip of the blade. The tip of the blade is where the greater amount of power is harvested, and where the most sweep area or width of the blade is present. However, this structure may put the lower part of the blade at a wrong angle and therefore reduce the lift of this portion of the blade. If the angle of attack of the blade with respect to the apparent wind gets too far off, the blade might begin to stall from the root up to the tip, creating drag at the root rather than lift. Therefore it is desirable to construct the blades of a wind turbine so they can change pitch for different wind conditions.

Also, including an outer rim about extra turbine blades adds weight to the perimeter of the turbine wheel.

Thus, it would be desirable to provide a wind turbine that has support for the outer ends of the turbine blades. It also would be desirable to provide a wind turbine that has improved variable pitch blades for controlling the speed of rotation of the turbine wheel, and desirable to provide blade extensions for increasing the ability of the wind turbine to catch more wind, and to be able to vary the pitch of the blade extensions.

SUMMARY OF THE DISCLOSURE

Briefly described, this disclosure sets forth features of a wind turbine that is powered by atmospheric wind and which can be used to create rotary energy that is transformed into an end product, such as to drive an electrical generator. The end use may vary in accordance with need, but a practical end use for the wind turbine is to create electricity by driving one or more electrical generators.

This disclosure includes a wind turbine wheel that includes extensions of the blades in the turbine wheel structure to add blade surface at the outer perimeter of the turbine wheel where the movement of the blades is fastest and where there is more distance of the sail extensions from the axis of rotation of the turbine wheel and more lever arm between the blade extensions and the axis of rotation to apply more torque from the wind to the turbine wheel.

In one form the wind turbine includes a turbine wheel that is rotatably mounted on a support about a laterally extending central axis. A plurality of radially extending blades are carried by the turbine wheel, with the blades made of light weight material, such as cloth or thin fiberglass, and extending generally radially from the central axis of the turbine wheel.

The turbine wheel may include shape control means that may be used for adjusting the attitude and shape of the sail cloth. The shape control means may include blade end supports attached to the opposed inner and outer ends of the blades for rotating the opposed ends of the blades and for selectively imparting pitch and/or a longitudinal twist to the blades.

Another form of the disclosure may be the use of blade extensions, sometimes referred to as "sailets", mounted on a perimeter rim where the rotary movement of the turbine wheel is the highest, the space available for the blade extensions is the greatest, and the lever arm from the blade extensions to the axis of rotation is the longest.

The outer end supports of the blades may be rotatable about their longitudinal axes with respect to the perimeter rim for turning the turbine blades and the blade extensions about their longitudinal axes for changing the pitch of the blades and blade extensions.

The support for the wind turbine may comprise an upright tower with the turbine wheel rotatably mounted on the tower about a laterally extending central axis. The tower may be supported on a solid foundation or the tower may be supported on a floatable support.

The turbine wheel may include a circular rim used for both stabilizing and supporting the blades and for turning a rotor of an electrical generator.

Other features and advantages of the structure disclosed herein may be understood from the following specification and accompanying drawings.

DETAILED DESCRIPTION

Figure 1:
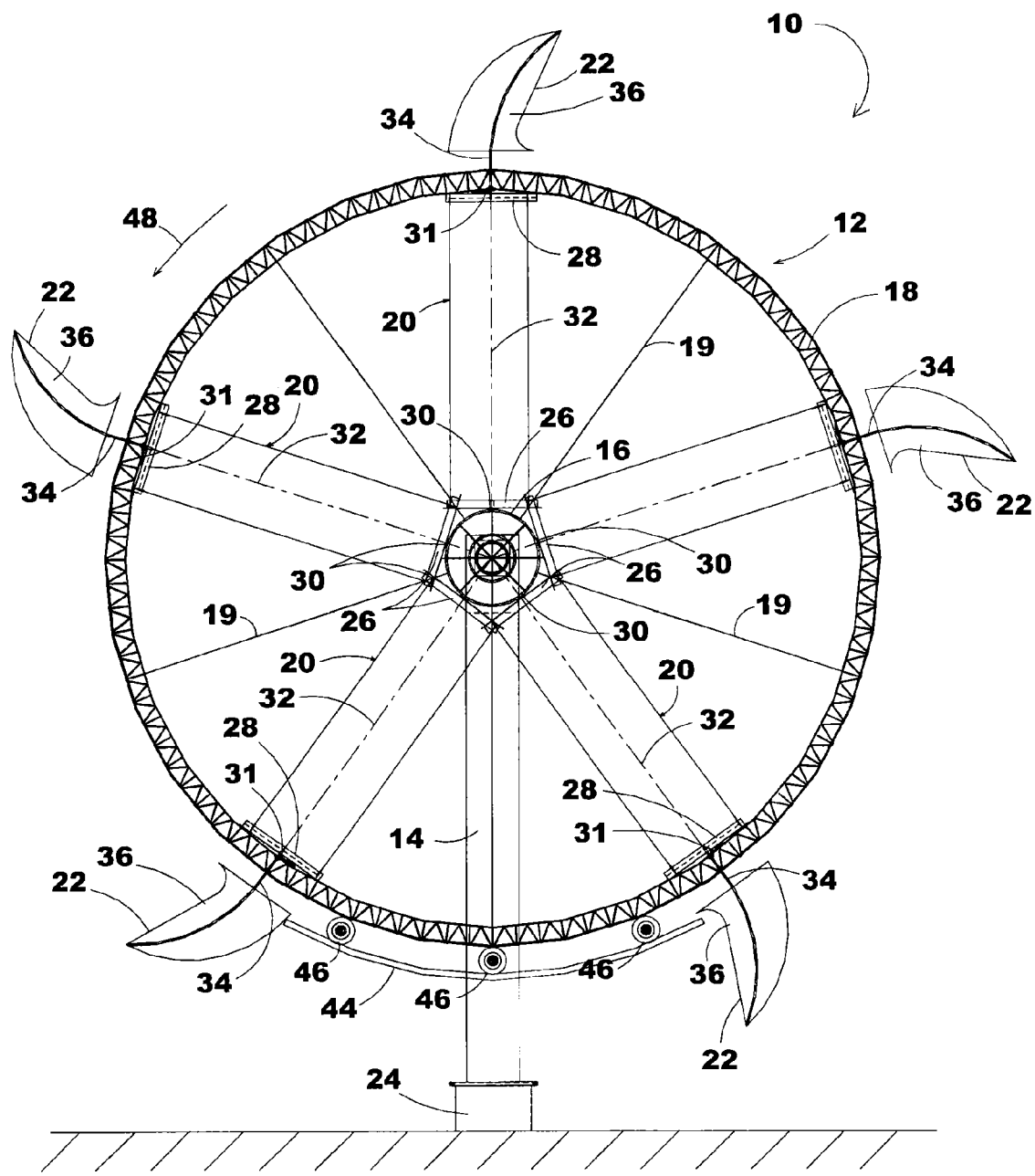
FIG. 1 is a front elevational view of a wind turbine having five blades and five blade extensions.

Referring now in more detail to the drawings in which like numerals indicate like parts throughout the several views, FIG. 1 shows a wind turbine 10 that includes a turbine wheel 12 mounted on a mast 14, with the turbine wheel rotatable about a laterally extending central axis structure 16 and configured for rotating in response to catching the atmospheric wind. The mast 14 is rotatably mounted on a mast support 24, and a motor (not shown) is arranged to rotate the mast 14 on the mast support so that the turbine wheel 12 may be directed toward or at an angle with respect to the atmospheric wind.

The turbine wheel 12 of FIG. 1 includes a circular rim assembly 18 and a plurality of turbine blades 20 are mounted between the central axis structure 16 and the circular rim assembly 18. While five turbine blades are illustrated, other numbers of turbine blades may be included, such as three or four turbine blades.

Turbine blade extensions 22 are mounted to and extend radially away from the circular rim assembly 18, with each turbine blade extension 22 being aligned with a turbine blade 20. The circular rim assembly 18 is supported by a plurality of support cables 19 that extend from the circular rim assembly inwardly toward the laterally extending central axis structure 16.

Figure 2B:
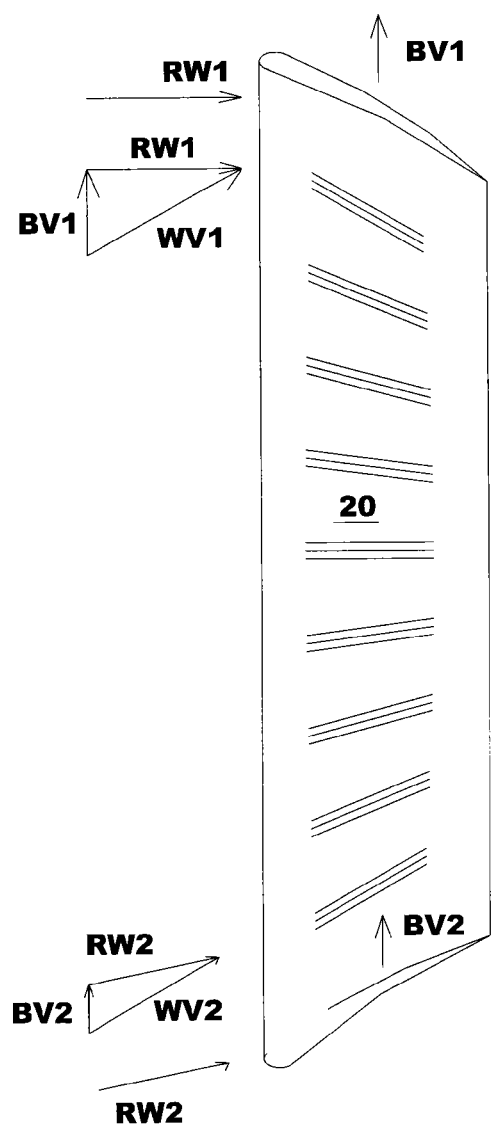
FIG. 2B is a vector diagram of the blade velocity, wind velocity and the relative wind velocity at both the base and tip of the blade of the wind turbine.
Figure 2A:
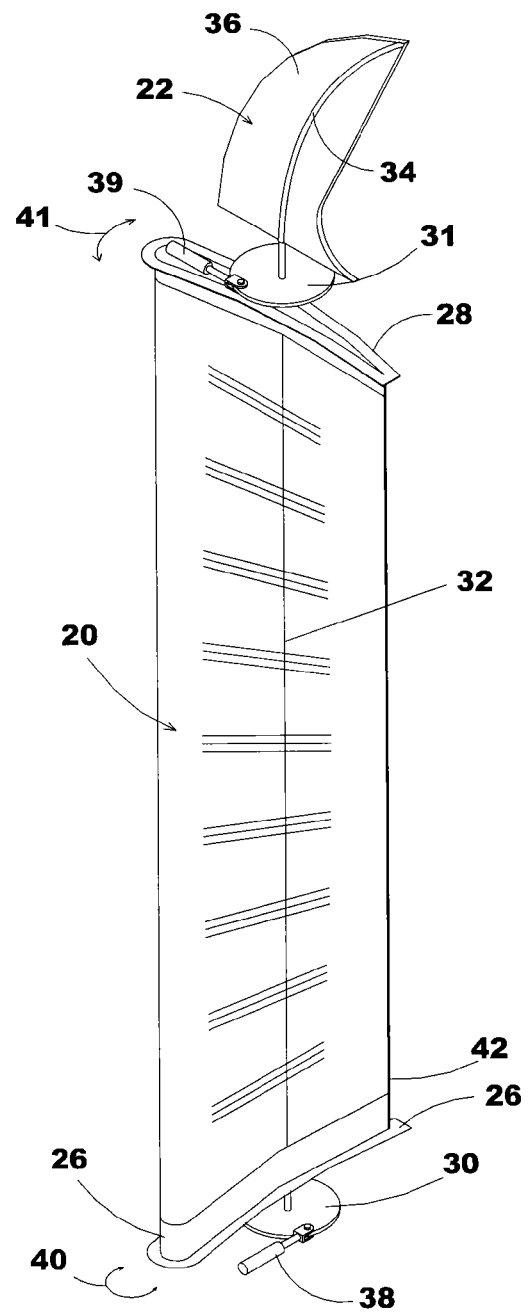
FIG. 2A is a perspective view of a blade of a wind turbine.
Figure 3:
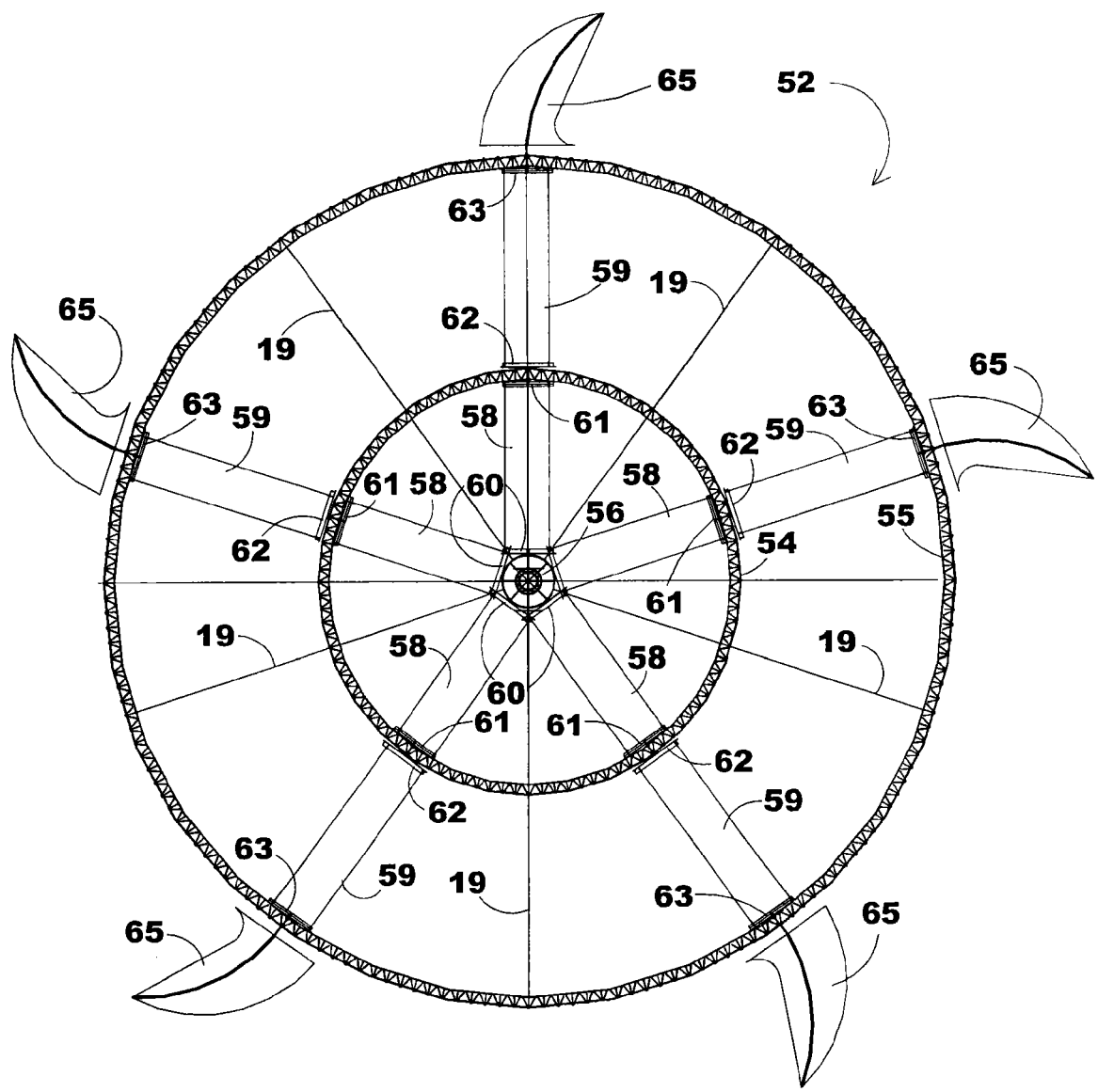
FIG. 3 is a front elevational view of a wind turbine with five blades and concentric rims with two sets of five blades and a set of blade extensions.
Figure 4:
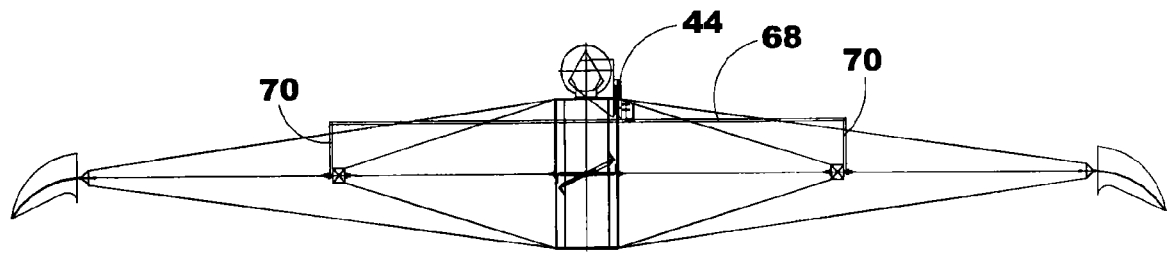
FIG. 4 is a top cross sectional view of the wind turbine of FIG. 3.
Figure 5:
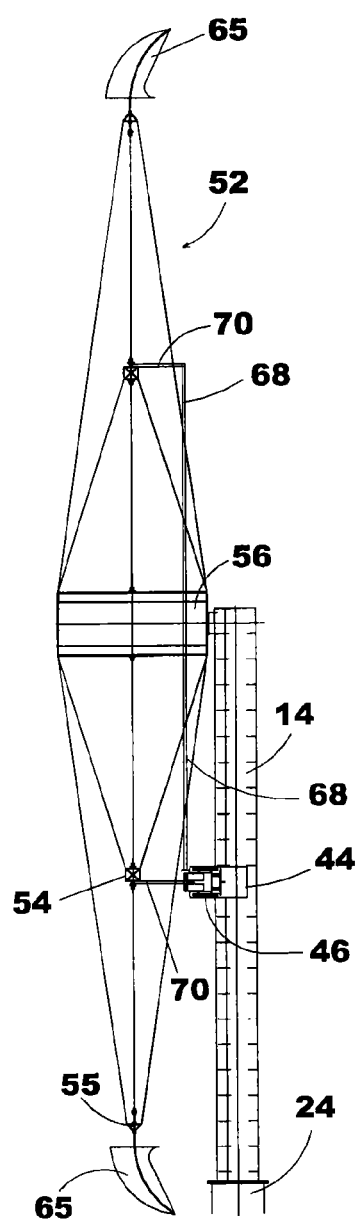
FIG. 5 is side cross sectional view of the wind turbine of FIG. 3.

As shown in FIG. 1, the turbine blades 20 may be rectangular and flat in the form of light weight fabric or other sheet material extending from the laterally extending central axis 16 toward the circular rim assembly 18. As shown in FIGS. 2A and 2B, the turbine blades also may be formed of other materials, such as light weight fiberglass that is flexible so that it may be twisted along its length to form a varying pitch from the inner end to the outer end of the blade and may be formed in cross section as an airfoil or wing-shape with a convex surface on one side of the blade to enhance the effect of the wind passing over the blades. Stiffer blades may be used if desired. It is desirable to make the turbine blades out of light weight material to reduce the weight of the turbine wheel. The turbine blades 20 illustrated in FIGS. 1 and 3 are illustrated without a pitch so that the elements of the blade may be more clearly illustrated. FIGS. 2A and 2B show a turbine blade in the shape of an airfoil and formed with a pitch.

In order to form the turbine blades 20 in the desired configuration, turbine blade control means are provided. One such blade control means may include the turbine blades 20 being mounted at their ends on turbine blade supports, such as inner turbine blade supports 26 and outer turbine blade supports 28. Each turbine blade support 26 and 28 may be mounted on a slewing ring 30, 31, with the inner slewing rings 30 pivotally attached to the laterally extending central axis structure 16 and the outer slewing rings 31 pivotally attached to the circular rim assembly 18. This allows the inner turbine blade supports 26 and outer turbine blade supports 28 to be independentably rotatable about the longitudinal axis 32 of each turbine blade 20. Slewing rings 30 and 31 are available from Rotek, Inc., at www.rotek-inc.com. Motors, such as electrical linear actuators or hydraulic cylinders 38 and 29, may be used to control the turning of the slewing rings and the inner and outer turbine blade supports 26 and 28. If desired, electric motors may be used to turn the slewing rings, such as motors available from Teknic, Inc. at www.teknic.com. Other types of turbine blade control means may be used, if desired.

The outer turbine blade supports 28 have a shaft that forms a mast 34 for the turbine blade extension 22. The turbine blade extensions 22 include a sail 36 mounted to the mast 34. The pitch of the sail 36 is determined by rotating the mast 34, and since the masts 34 are controlled by the outer turbine blade supports 28, the blade extensions 22 rotate in unison with the outer turbine blade supports 28.

As shown in FIG. 2A, the turbine blade 20 has its inner turbine blade support 26 and outer turbine blade support 28 mounted on inner stewing ring 30 and outer slewing ring 31, respectively, and motors 38 and 39, such as electric linear actuators or hydraulic cylinders, are arranged to rotate the slewing rings 30 and 31 and thereby rotate inner and outer turbine blade supports 26 and 28, as indicated by the arrows 40 and 41. The motors 38 and 39 may operate independently of each other for each turbine blade 20, so that the inner turbine blade support 26 may be rotated in the same or opposite directions and more or less than the outer turbine blade support 28, thereby forming a twist or "pitch" to the blade about the longitudinal axis 32 of the blade. Thus, the linear actuators 38 and 39, slewing rings 30 and 31, and their turbine blade supports 26 and 28 function as turbine blade control means.

The motors 38 and 39 of FIG. 2A are mounted on the turbine wheel as shown in FIG. 1 and rotate with the turbine wheel, and the motors may be actuated while the turbine wheel is rotating. Also, a computer program may be used to actuate the motors that change the configuration of the turbine wheel in response to detecting changing conditions, such as changing the shapes of the turbine blades in response to changes in atmospheric conditions, in response to varying electrical loads on the generators, and in response to other varying conditions. This can be done while the turbine wheel is in motion. Thus, the shapes of the turbine blades may be made "on the fly."

The close proximity of the turbine blade extensions 22 to the outer end portion of the turbine blades will allow the pitch of the turbine blade extensions 22 to be substantially the same as the pitch of the outer end of the turbine blade 20, with the surfaces of these blades being effective to efficiently catch the wind and rotate the turbine wheel 12. The turbine blade extensions 22 may have an air foil cross section to enhance the force applied by the wind to the turbine blade extensions.

As shown in FIG. 2B, the turbine blades 20 may be formed in the shape of an airfoil with one convex surface and one surface that is not convex, usually a flat or concave shape. When the turbine blades rotate about the laterally extending central axis structure 16, the outer end portions of the blade move at a higher velocity than the inner portions of the blades. For best efficiency of blade performance, the blades should be twisted along their lengths so that the blade surfaces will be compatible with the relative wind that engages and moves the blades.

For example, as shown in FIG. 2B, near the outer tip of the blade, the blade velocity $BV_1$ is greater than the blade velocity $BV_2$ at the base of the blade. The wind velocities at the tips and bases of the blades, $WV_1$ and $WV_2$, respectively, will be the same for both ends of the blades. The difference in blade velocities $BV_1$ versus $BV_2$ results in a change in the direction of the relative winds, $RW_1$ and $RW_2$, as shown in the diagram of FIG. 2B. Therefore, the twist of the blade compensates for the anticipated direction of the velocities of the relative winds $RW_1$ and $RW_2$.

As shown in FIG. 1, a cradle 44 is supported by mast 14 and surrounds the lower arc of the turbine wheel 12. The turbine wheel 12 rotates with respect to the cradle 44. The cradle 44 supports at least one, preferably several generators 46 that are mounted adjacent the perimeter of the turbine wheel 12, with the generators and the cradle being longitudinally offset from the turbine wheel so as not to interfere with the movement of the turbine blade extensions 22 as the turbine wheel rotates in the direction as indicated by arrow 48.

FIG. 3 shows a modified turbine wheel 52 that has concentric circular rim assemblies, inner rim assembly 54 and outer rim assembly 55, both concentric with the axis structure 56. Additionally, turbine wheel 52 includes two sets of turbine blades, inner turbine blades 58 and outer turbine blades 59. There are five each of the inner turbine blades 58 and the outer turbine blades 59, oriented at equal angles about the axle assembly 56, with the inner turbine blades extending between the axis structure 56 and inner rim assembly 54, and the outer turbine blades 59 extending between the inner rim assembly 54 and the outer rim assembly 55. The blades of the inner turbine blades 58 include the inner turbine blade supports 60 and outer blade supports 61 for controlling the pitch of the blades. Similarly, the outer turbine blades 59 include inner turbine blade supports 62 and outer turbine blade supports 63. More specifically, the inner blade supports 60 support the inner end portions of the inner turbine blades 58, while the outer blade supports 61 support the outer end portions of the inner turbine blades 58. Likewise, inner turbine blade supports 62 support the inner end portions of the outer turbine blades 59, whereas outer blade supports 63 support the outer portions of the outer turbine blades 59. Motors (not shown) similar to those illustrated in FIG. 2, are used to turn the blade supports 60-63 about the longitudinal axes of the inner and outer turbine blades so as to turn the ends of the turbine blades about their respective longitudinal axes, forming a twist or "pitch" to the blades, as may be desired. Also, the turbine blade extensions 65 may be mounted to the outer turbine blade supports 63 and move in unison with them, as previously described with respect to FIGS. 1 and 2.

It would be noted from FIGS. 1 and 3 that the turbine blade extensions, such as the turbine blade extensions 65 of FIG. 3, are aligned with the inner and outer turbine blades 58 and 59, and their rotational positions about the longitudinal axes of the aligned blades may be controlled by the outer blade supports 63 of the outer turbine blades 59. However, other blade supports may be used to control and support the blade extensions, if desired.

The use of the turbine blade extensions 22 and 65 instead of adding another circular rim to add more turbine blades reduces the weight of the turbine wheel. The lower weight reduces the expense of the structure. The use of the turbine blade extensions is inexpensive in comparison to the other blades of the wind turbine and is an inexpensive way of increasing turbine diameter and therefore power output. The turbine blade extensions eliminate the overweight and over length of highway loads which reduces transportation costs from factory to installation sites and opens up the practical possibility of placing wind turbines at ski resorts and other mountaintop locations for generating electricity at remote locations.

Since the turbine blade extensions 22 of FIG. 1 and the turbine blade extensions 65 of FIG. 3 protrude beyond the limits of the circular rim assemblies, room is made for the blades as they rotate about the axle assemblies 16 and 56. Accordingly, the cradle 44 as shown in FIGS. 1 and 4-6 is longitudinally offset from the path of the turbine blade extensions 22 and 65. A longitudinally offset circular rim 68 is positioned between the mast 14 and the turbine wheel 12, with the offset circular rim 68 being supported at intervals about the turbine wheel by axially extending support arms 70. The support arms 70 may be supported by the inner circular rim 54. The longitudinally off set circular rim 68 rotates in unison with the turbine wheel about the central axis structure of the turbine wheel.

Figure 6:
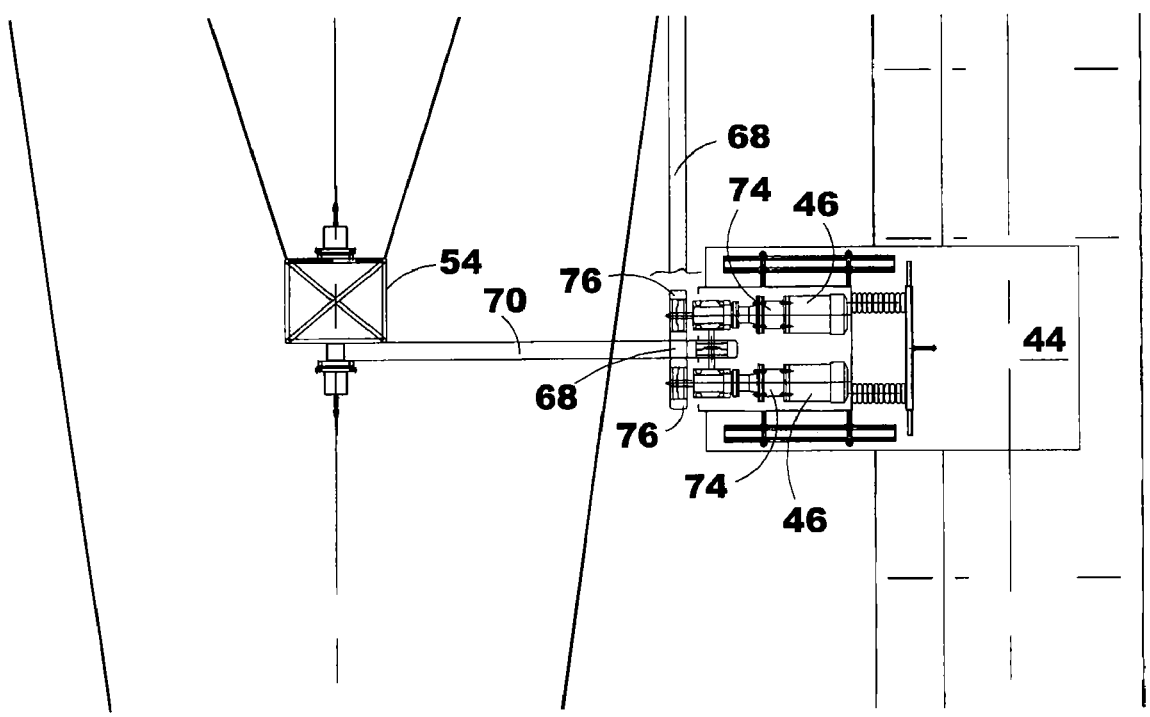
FIG. 6 is a side view of the generator mounted on the mast of the wind turbine and in engagement with the inner circular rim of the wind turbine of FIGS. 3-4.

As shown in FIG. 6, the generators 46 are supported by the cradle 44. A similar cradle may be used to support the generators of FIG. 1. The generators 46 of FIG. 6 have a gear reducer 74 and are driven by rotary elements such as wheels 76 which engage the longitudinally offset circular rim 68.

FIG. 6 shows the offset relationship of the longitudinally offset circular rim 68 that is supported by the inner rim 54 of the turbine wheel, and a similar arrangement is available for having the generators engage the outer rim 55 of the turbine wheel.

Figure 7:
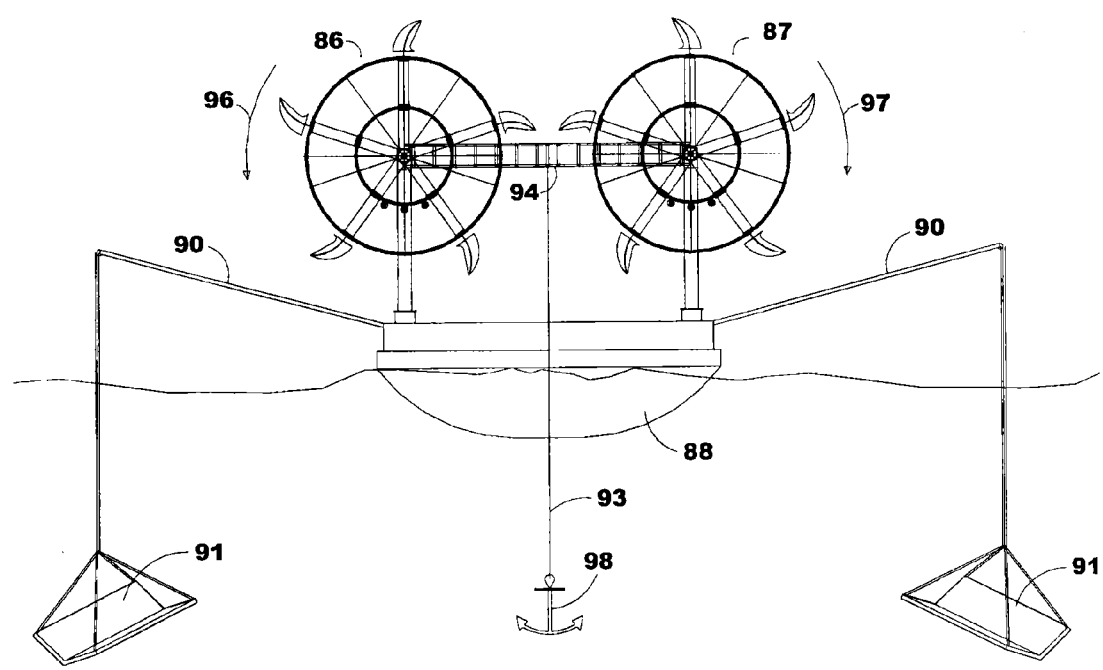
FIG. 7 is a perspective view of a pair of wind turbines of FIG. 7 mounted on a floatable support.

FIG. 7 is a perspective illustration of a pair of turbine wheels 86 and 87, mounted on a floatable support 88. The turbine wheels are substantially the same as that of FIG. 6 except that the pitch of the blades for one turbine wheel is opposite to the pitch of the blades of the other turbine wheel as indicated by arrows 96 and 97 so that the turbine wheels rotate in opposite directions in response to catching the wind. Also, outriggers 90 are supported by the floatable support and sea anchors 91 are suspended from the outriggers so as to reduce the tendency of the floatable support from tilting in response to wave action or wind action, or a combination thereof. Also, an anchor cable 93 extends to the horizontal support 94 at a position between the turbine wheels 86 and 87 with the anchor cable connected to an anchor 98 in the upwind direction from the turbine wheels 86 and 87. The anchor cable tends to resist the force applied by the atmospheric wind to the turbine wheels 86 and 87, with the anchor cable being connected to the turbine wheels support at the level of the axis structures of the turbine wheels, which balances the forces applied by the atmospheric wind to the turbine wheels.

It will be understood by those skilled in the art that while the foregoing description sets forth in detail preferred embodiments of the present invention, modifications, additions, and changes might be made thereto without departing from the spirit and scope of the invention, as set forth in the following claims.

The invention claimed is:

1. A wind turbine comprising:
    a turbine wheel rotatably mounted coaxially about a laterally extending central axis structure and configured for rotating in response to catching the atmospheric wind,
    said turbine wheel including a circular rim mounted coaxially with said central axis structure,
    a plurality of turbine blades mounted in said turbine wheel and extending radially out from said central axis structure toward said circular rim and configured for catching the atmospheric wind,
    a plurality of turbine blade extensions extending radially out from said circular rim and configured for catching the atmospheric wind,
    turbine blade control means positioned at said circular rim and configured for turning the ends of said turbine blades to vary the pitch of said turbine blades and for turning said turbine blade extensions to vary the pitch of said turbine blade extensions,
    an offset circular rim mounted to said turbine wheel coaxially with said central axis structure of said turbine wheel and axially off set from said turbine blades and said turbine blade extensions and rotatable in unison with said turbine wheel, and
    at least one electrical generator axially off set from said turbine wheel in driven relationship with said offset circular rim.

2. The wind turbine of claim 1, wherein each of said turbine blade extensions is positioned in alignment with one of said turbine blades, and said turbine blade control means is connected to said turbine blade extensions for moving said turbine blade extensions in unison with said turbine blades.

3. The wind turbine of claim 1, wherein said turbine blade extensions are each mounted on a mast, and wherein said turbine blade control means is configured to turn said mast.

4. The wind turbine of claim 1, wherein:
    said turbine blades each include opposed inner ends and outer ends, opposed side edges, and a longitudinal axis extending between said inner and outer ends and extending radially from said central axis,
    said turbine blade control means is attached to said opposed inner and outer ends of said turbine blades for rotating said opposed ends of turbine blades about said longitudinal axis and imparting a longitudinal twist to the turbine blades.

5. The wind turbine of claim 1, and further including
    a floatable support,
    a mast mounted on said floatable support, and
    said turbine wheel mounted on said mast.

6. The wind turbine of claim 5, and further including outriggers extending from said floatable support, and sea anchors connected to said out riggers for controlling the movement of said floatable support.

7. The wind turbine of claim 1, and further including an anchor connected to said turbine wheel at the level of said central axis structure of said turbine wheel.

8. The wind turbine of claim 1, wherein two of said wind turbines are mounted side-by-side with substantially parallel axes of rotation, and an anchor connected to said turbine wheels at the level of said axis of rotation of said turbine wheels.

9. A wind turbine comprising:
    a turbine wheel rotatably mounted about a laterally extending central axis structure and configured for rotating about said laterally extending axis structure in response to catching atmospheric wind,
    said turbine wheel including a circular rim mounted coaxially with said central axis,
    a plurality of turbine blades mounted in said turbine wheel and extending radially outwardly toward said circular rim and configured for catching the atmospheric wind,
    a plurality of turbine blade extensions mounted at said circular rim and extending radially out from said circular rim and configured for catching the atmospheric wind, and
    turbine blade control means positioned at said circular rim and operatively connected to both said turbine blades and said turbine blade extensions for turning the ends of said turbine blades to vary the pitch of said turbine blades and for turning said turbine blade extensions to vary the pitch of said turbine blade extensions.

10. The wind turbine of claim 9 and wherein said turbine blades are formed of a material selected from a group consisting essentially of: woven cloth, and fiberglass.

11. The wind turbine of claim 9 and wherein said turbine blade extensions are each aligned with one of said turbine blades.

12. The wind turbine of claim 9 and wherein said turbine blade extensions are configured to change pitch in unison with the change of pitch of said turbine blades.

13. The wind turbine of claim 9 and wherein said turbine blade control means is selected from a group consisting of an electrical linear actuator and hydraulically operated cylinder.

14. A wind turbine comprising:
    a turbine wheel rotatably mounted about a laterally extending central axis structure and configured for rotating in response to catching the atmospheric wind,
    said turbine wheel including an inner circular rim mounted coaxially with said central axis and an outer circular rim larger than said inner circular rim and mounted coaxially with said central axis,
    a plurality of turbine blades mounted in said turbine wheel and extending radially out from said inner circular rim to said outer circular rim and configured for catching the atmospheric wind,
    a plurality of turbine blade extensions mounted to said outer circular rim and extending radially out from said outer circular rim and aligned with said turbine blades and configured for catching the atmospheric wind,
    turbine blade control means positioned at said outer circular rim for turning the ends of said turbine blades to vary the pitch of the turbine blades and for turning the turbine blade extensions to vary the pitch of said turbine blade extensions.

15. The wind turbine of claim 14, and further including a plurality of said turbine blades extending between said inner axis structure and said inner circular rim.

16. The wind turbine of claim 14, and wherein said turbine blade control means includes at least one motor configured to pivot the ends of the turbine blades with respect to each other.

17. The wind turbine of claim 14, and wherein said turbine blade control means includes turbine blade end supports mounted to opposite ends of said turbine blades for independently rotating the ends of said turbine blades to form twists in said turbine blades.

18. The wind turbine of claim 14, and further including an offset circular rim mounted to said turbine wheel coaxially with said central axis structure of said turbine wheel and axially off set from said turbine blades and said turbine blade extensions and rotatable in unison with said turbine wheel, and an electric generator positioned in registration with said offset circular rim for generating electricity in response to the rotation of said turbine wheel.

19. The wind turbine of claim 14, wherein said turbine blades are formed of fiberglass and are shaped as an airfoil along their lengths.

20. A wind turbine for generating electricity, comprising:

a support, a turbine wheel rotatably mounted on said support about a laterally extending central axis structure, a plurality of turbine blades carried by said turbine wheel, said turbine blades each including opposed inner and outer ends extending radially from said central axis structure, a turbine blade extension aligned with each of said turbine blades, shape control means carried by said turbine wheel for changing the angles of both the inner ends and outer ends of said turbine blades and said turbine blade extensions, an offset circular rim mounted to said turbine wheel coaxially with said central axis structure of said turbine wheel and axially off set from said turbine blades and said turbine blade extensions and rotatable in unison with said turbine wheel, and at least one electrical generator in driven relationship with said offset circular rim.

21. The wind turbine of claim 20, wherein said shape control means comprises end supports pivotably mounted to said turbine wheel for turning at least one end of said turbine blades to form a twist in said turbine blades.

22. The wind turbine of claim 20, wherein said plurality of turbine blades extending radially within said turbine wheel comprise an inner ring and the outer ring of turbine blades.

* * * * *